United States Patent Office 2,698,229
Patented Dec. 28, 1954

2,698,229

REDUCTION OF METAL OXIDES

Thayer Lindsley, New York, N. Y., and Lyall J. Lichty, Ottawa, Ontario, Canada, assignors to Quebec Metallurgical Industries Limited, Ottawa, Ontario, Canada, a corporation of Canada No Drawing. Application August 21, 1953, Serial No. 375,830

8 Claims. (Cl. 75—40)

This invention relates to the reduction of metal oxides or oxide ores to the corresponding metals and more particularly to the reduction of such oxides by smelting with reducing agents which tend to combine with the reduced metal. More specifically, the invention relates to a method for smelting a metal oxide or oxide ore, such as an ore containing oxides of iron, nickel, cobalt or mixtures thereof, to produce a metal, such as iron, nickel, cobalt, ferronickel, ferrocobalt, etc., which is substantially free of or contains an unusually low content of such impurities as carbon, silicon, sulfur and phosphorus or any deleterious component of the reducing agent used.

In our copending application Serial No. 239,028, filed July 27, 1951, now Patent No. 2,653,867 we have described a method for reducing metal oxides to their corresponding metals by smelting with certain reducing agents which tend to combine with the reduced metal. That method was based upon the discovery that a metal of extremely high purity could be produced by mixing the metal oxide ore with a suitable flux, such as lime, and smelting in an electric furnace with a combination reducing agent consisting essentially of substantially pure carbon, such as charcoal, and a silicon containing material, such as ferrosilicon or aluminum ferrosilicon, in certain relative proportions.

The present application is a continuation in part of our above mentioned copending application Serial No. 239,028, now Patent No. 2,653,867. The present invention is based upon the discovery that substantially pure carbon, such as charcoal, when used in certain proportions in conjunction with a phosphorus containing material, such as ferrophosphorus, provides a combined reducing agent capable of producing surprising advantageous results in the reduction of metal oxides, such as iron oxide. Thus, when an iron oxide ore and a suitable flux is mixed and smelted with a combination reducing agent consisting of charcoal and ferrophosphorus in relative proportions such that the charcoal is calculated to combine with about 80 per cent of a given weight of oxygen and the phosphorus is calculated to combine with about 20 per cent of such given weight of oxygen to form carbon monoxide and phosphorus pentoxide, an iron metal is produced containing surprisingly low contents of carbon, silicon, sulfur and phosphorus. Other forms of substantially pure carbon may be used in place of charcoal and other non-carbonaceous materials capable of reducing the metal oxide to its corresponding metal, such as ferrosilicon or aluminum ferrosilicon, may be used in conjunction with ferrophosphorus.

Any conventional smelting procedure may be employed. However, we prefer to melt a mixture of the metal oxide or ore, a flux such as lime, and the combination reducing agent in a suitable electric furnace at a temperature slightly above the melting temperature of the reduced metal to form a molten burden consisting of slag and the reduced metal. The composition and amount of the flux used depends upon the amount and nature of the impurities in the metal oxide or ore to be reduced and upon the composition of the furnace lining as will be understood by those skilled in the art.

The combination reducing agent may be used in sufficient amount in excess of that theoretically required for complete reduction of the metal oxide to assure a satisfactory high yield of metal. An amount of about 15 to 20 per cent in excess of that theoretically required usually is sufficient to assure a high yield of metal but a larger excess may be used without substantially increasing the amounts of deleterious elements in the metal recovered. By the practice of the invention, a metal product may be produced in which the amount of phosphorus does not exceed 0.10 per cent by weight, the amount of either carbon or silicon does not exceed 0.10 per cent by weight and the combined amount of carbon and phosphorus does not exceed 0.15 per cent by weight.

The present invention contemplates particularly smelting a metal oxide or metal oxide ore using a combination reducing agent comprising finely divided substantially pure carbon, such as charcoal, and a finely divided phosphorus containing material, such as ferrophosphorus. A metal of high purity can be produced when the relative proportions of the carbon and the non-carbonaceous reducing agent are used in relative proportions such that the carbon is calculated to combine with from about 45 to about 85 per cent by weight of a given weight of oxygen and the other effective reducing agent, namely, phosphorus, is calculated to combine with from about 55 to about 15 per cent by weight of such given weight of oxygen. A portion of the ferrophosphorus may be replaced by another effective non-carbonaceous reducing agent for the metal oxide, such as ferrosilicon or aluminum ferrosilicon. Thus, an amount of ferrophosphorus may be used calculated to combine with about 5 per cent of such given weight of oxygen and the remainder of the non-carbonaceous reducing agent used may be ferrosilicon or aluminum ferrosilicon or a mixture thereof.

The amounts of carbon, ferrophosphorus, ferrosilicon and aluminum ferrosilicon used are calculated upon the basis of the requirements of the equations $$C+O \rightarrow CO$$
$$Si+O_2 \rightarrow SiO_2$$
$$4P+5O_2 \rightarrow 2P_2O_5$$

and the aluminum in the aluminum ferrosilicon is assumed to be silicon.

The method of the invention is applicable for smelting metal oxides or oxide ores containing an oxide of a metal, such as chromium, molybdenum, tungsten, vanadium, nickel, cobalt, etc., with or without iron oxide, to produce the corresponding metal or ferroalloy.

The invention is illustrated further by the following specific example. The smelter charge contained elemental phosphorus in the form of ferrophosphorus in an amount equal to 22.9 per cent of the stoichiometric requirement of reductant to reduce all of the iron in the magnetite smelted. Carbon in the form of charcoal amounted to 92.9 per cent of the stoichiometric requirement. Hence, the phosphorus plus carbon in the charge amounted to 115.8 per cent of the stoichiometric requirement of reductant to reduce all of the iron in the magnetite smelted. The above figures were calculated on the basis that iron was present as $Fe_3O_4$ in the magnetite, that reduction by carbon produced Fe plus CO, and that reduction by phosphorus produced Fe plus $P_2O_5$. The charge also contained lime hydrate to flux the acid constituents of the charge and the $P_2O_5$ product. The finely divided materials were intimately mixed and the mixture fed continuously into a single phase arc furnace lined with magnesia refractory and having two graphite electrodes.

The weights and analyses of charge materials were:

| Material | Weight, lbs. | Analysis, percent | | |
|---|---|---|---|---|
| | | Fe | P | C |
| Magnetite ore | 300.00 | 67.7 | .03 | |
| Ferrophosphorus (iron phosphide) | 55.00 | 75.0 | 25.0 | |
| Charcoal | 63.75 | | | 84.8 |
| Lime hydrate | 120.00 | | | |

The weights and analyses of the smelter products were:

| Material | Weight, pounds | Analysis, percent | | | | |
|---|---|---|---|---|---|---|
| | | Fe | P | C | Si | S |
| Metal | 228.0 | 99.8 | .08 | .023 | .02 | .034 |
| Slag | 209.0 | 8.1 | | | | |

The metal product contained 93.1 per cent of the iron present in the charge as both iron ore and as iron metal contained in the ferrophosphorus. The slag contained 6.9 per cent of the iron in the charge. Hence, all of the iron in the smelter charge was accounted for in the metal and slag products.

The components of the combination reducing agent should be substantially free of elements, such as sulfur, the presence of which are known to have a deleterious effect in iron and its alloys. The term "substantially pure carbon" as used herein is intended to mean carbon in a form which is substantially free of elements, such as sulfur, the presence of which are known to have a deleterious effect in iron and its alloys.

In addition to its obvious advantages, the invention provides a method adapted for recovering a commercial grade of metal directly from the iron oxide ore occurring in Uganda and containing a high content of phosphorus. A typical analysis of such ore is $SiO_2$ about 3.5%, FeO about 73.2%, $Al_2O_3$ about 9.7%, CaO about 2.3%, MgO about 0.15% and phosphorus about 1.40%.

We claim:

1. In a method of smelting a metal oxide ore or the like wherein said ore is melted with a flux and a reducing agent, which tends to combine with the metal produced, to form a molten burden comprising a slag and the metal component of said oxide, the improvement wherein said reducing agent consists essentially of finely divided substantially pure carbon and a finely divided non-carbonaceous reducing agent for said oxide in relative proportions such that said carbon is calculated to combine with from about 45 to about 85 per cent by weight of a given weight of oxygen to form carbon monoxide and said non-carbonaceous reducing agent is calculated to combine with from about 55 to about 15 per cent by weight of said given weight of oxygen to form an oxide of the effective reducing component of said non-carbonaceous material, at least a portion of said non-carbonaceous reducing agent being ferrophosphorus in an amount calculated to combine with at least 5 per cent by weight of said given weight of oxygen.

2. The method as described by claim 1 wherein said non-carbonaceous reducing agent consists essentially of ferrophosphorus.

3. The method as described by claim 1 wherein said non-carbonaceous reducing agent consists essentially of ferrophosphorus and a material selected from the group consisting of ferrosilicon and aluminum ferrosilicon.

4. The method as described by claim 1 wherein said metal oxide is selected from the group consisting of iron oxide, nickel oxide, cobalt oxide and mixtures thereof.

5. The method as described by claim 2 wherein said ferrophosphorus is calculated to combine with about 20 per cent by weight of said given weight of oxygen and said carbon is calculated to combine with about 80 per cent by weight of said given weight of oxygen.

6. The method as described by claim 2 wherein said metal oxide is selected from the group consisting of iron oxide, nickel oxide, cobalt oxide and mixtures thereof.

7. The method as described by claim 3 wherein said metal oxide is selected from the group consisting of iron oxide, nickel oxide, cobalt oxide and mixtures thereof.

8. The method as described by claim 4 wherein said metal oxide is selected from the group consisting of iron oxide, nickel oxide, cobalt oxide and mixtures thereof.

No references cited.